March 3, 1942.  W. A. RAY  2,274,939
CONTROL DEVICE
Filed July 27, 1939  3 Sheets-Sheet 1

WILLIAM A. RAY, INVENTOR;
BY John H. Rouse, ATTORNEY.

March 3, 1942.  W. A. RAY  2,274,939
CONTROL DEVICE
Filed July 27, 1939  3 Sheets-Sheet 2
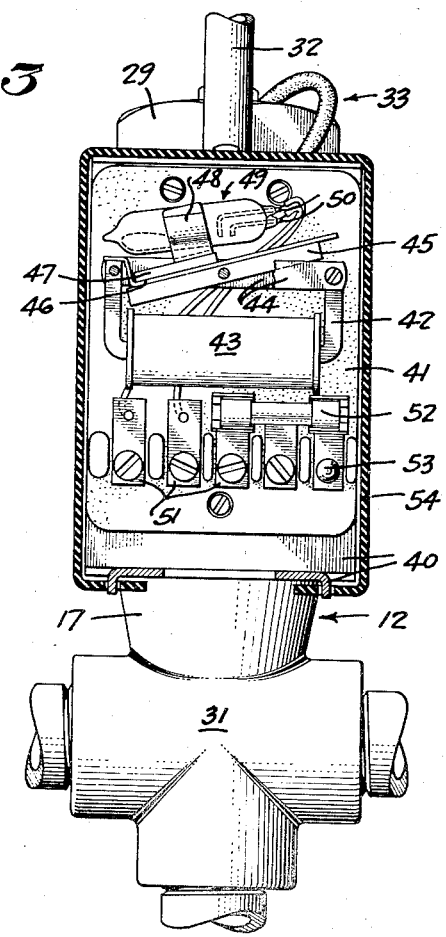
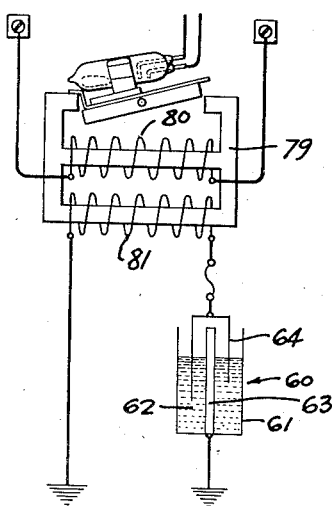
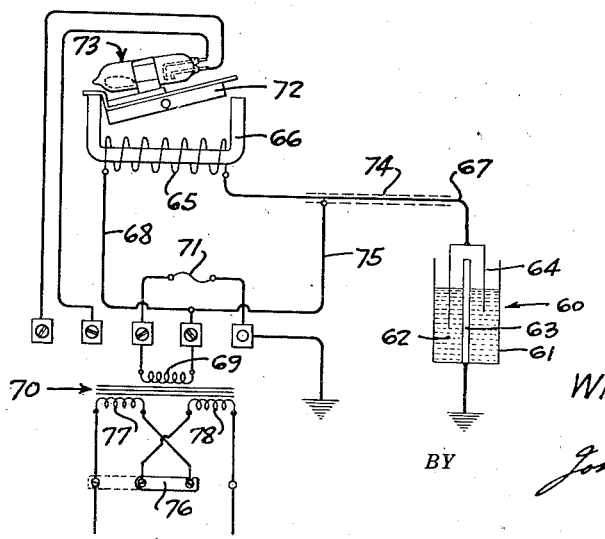
WILLIAM A. RAY,
INVENTOR:
BY John H. Rouse,
ATTORNEY.

March 3, 1942. W. A. RAY 2,274,939
CONTROL DEVICE
Filed July 27, 1939 3 Sheets-Sheet 3

WILLIAM A. RAY,
INVENTOR;

BY John H. Rouse,
ATTORNEY.

Patented Mar. 3, 1942

2,274,939

UNITED STATES PATENT OFFICE 2,274,939

CONTROL DEVICE

William A. Ray, Glendale, Calif.

Application July 27, 1939, Serial No. 286,859

7 Claims. (Cl. 200—152)

My present invention relates to automatic burner control systems and in particular to improved control means responsive to the level of the water in a boiler for preventing the operation of the burner associated therewith when the water falls below a predetermined safe level. Such a device is commonly known in the art as a low water cutout.

It is an object of my invention to provide a device of the character described which depends for its operation on the electrical conductivity of the average water.

Another object of the invention is to provide, in such a device, electrical conducting electrodes so arranged that substantially all of the current flowing through the water passes between said electrodes, independently of the other surfaces of the device or of the wall of the boiler in which the device is installed.

Another object is to provide electrodes so formed and arranged that differential of operation of a translating device in circuit therewith is effected between the rise and fall of the water.

Another object is to provide electrodes so arranged and of such effective area with respect to each other that the current density at the surfaces of the electrodes is low.

Another object is to provide electrodes such that the voltage thereacross necessary for successful operation of the system is relatively low.

Another object is to provide electrodes so arranged with respect to each other that a relatively sudden increase in current is produced on predetermined rise of water in the boiler.

Another object is to provide a casing for the electrodes having means for mounting the same in an inclined plane so that the area of the electrodes presented to the water is gradually increased as the water rises.

Another object is to provide novel electrical translating means which, while obviously not so limited, has particular utility in a boiler water level control system.

Other objects and advantages of my invention will be found in the description, the drawings and the appended claims.

For complete understanding of the invention, reference may be had to the following detailed description and accompanying drawings, wherein:

Figure 3 is a section taken generally on the line 3—3 of Fig. 2;

Figure 4 is a circuit diagram of the control device shown in Figs. 1, 2 and 3;

Figure 5 is a modified control circuit diagram; and

Figure 1:
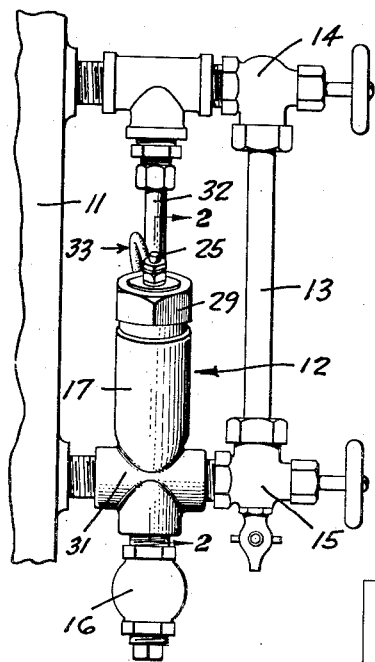
Figure 1 is a side elevation of a control device embodying my present invention and shown, together with other apparatus, connected to the wall of a boiler.
Figure 2:
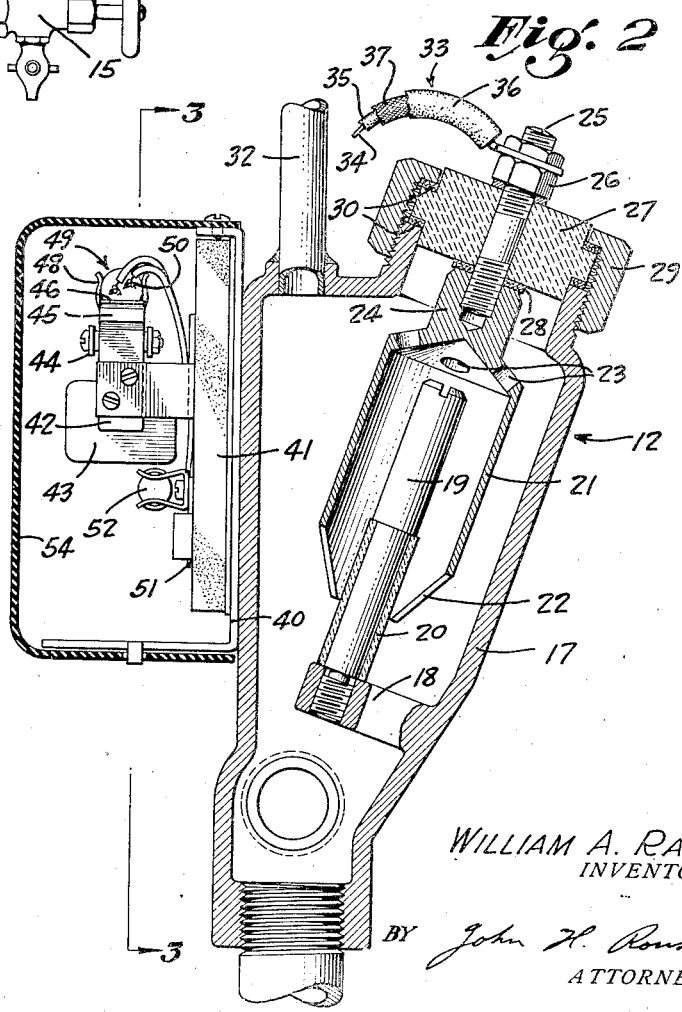
Figure 2 is an enlarged sectional view of the device shown in Fig. 1 taken generally on the line 2—2 thereof.

Referring first to Figs. 1, 2 and 3 of the drawings, the numeral 11 indicates the wall of a boiler in which is mounted, by conventional pipe fittings, a low water cutout device generally indicated at 12. A water level gauge glass 13 is provided between the shut-off valves 14 and 15. Connected to the bottom of the cutout device 12 is a sediment bulb 16.

The cutout device 12 comprises a casing 17 provided with an integral internally projecting portion 18 which supports a cylindrical electrode 19, the reduced lower end portion of which is surrounded by a tube 20 of electrical insulating material, such as porcelain.

Surrounding the upper portion of electrode 19 is a shell-like electrode 21 having portions cut away from its lower end to provide an effectively tapered mouth 22, and having openings 23 in its upper end wall for passage of fluid. Secured to the reduced upper extension 24 of the shell by a threaded terminal 25 and nut 26 is a disk 27 of insulating material, such as porcelain. A washer 28, of resilient material, serves to seal the opening in the disk through which the terminal extends.

A nut 29, threaded on a boss surrounding an opening in the upper end wall of the casing, secures the disk 27, and thereby the shell electrode, in the casing. Resilient washers 30 are interposed between the surfaces of the nut and the boss to seal the opening and to prevent breakage of the porcelain disk.

To minimize the effect of electrolysis, the electrodes 19 and 21 are preferably formed of the same metal, such as brass or stainless steel, but other electrically conductive materials, such as carbon, may be employed for one or both of the electrodes.

The casing 17 is provided at its lower end with an internally threaded T portion 31 for the reception of pipe fittings, and at its upper end with a pipe 32, for connecting the casing to a boiler adjacent its low water level.

A connecting cable 33 for electrode 21 comprises a conducting wire 34 surrounded by insulating coverings 35 and 36 between which is provided a braided shield 37, the function of which will be hereinafter described.

Secured to ears (not shown) on the casing is a plate 40 supporting an insulating base 41 on which is mounted a relay structure comprising a U-shaped core 42, the horizontal portion of which is surrounded by an energizing coil 43. Pivoted in supporting plates 44 of non-magnetic material secured to the end portions of the core is a rotatable armature 45. A movement limiting plate 46, a weight-biasing member 47, and a mounting clip 48, all of non-magnetic material, are secured to the upper surface of the armature. Mounted in the clip 48 is a mercury switch 49 of the tilting type and having terminals 50. Plates 51, for electrical connection to the relay coil and switch and two of which support clips for a fuse 52, are provided on the lower portion of the base 41. A rivet 53 extends through the base and into the metal plate 40 for grounding one end of the fuse. A cover 54 protects the relay from dust and accidental damage.

With sufficient current flow through the energizing coil 43, the armature 45 is attracted to horizontal position, tilting the mercury tube switch to complete the circuit through its terminals. In this position of the armature its ends are close to, but out of contact with, the core. The right hand end of stop member 46 (Fig. 3) is also just out of contact with the core. Consequently the armature floats noiselessly in its attracted position, and, as there is no contact between the armature and the core, there is no possibility of magnetic sticking when the coil circuit is opened. When the current through the coil is sufficiently reduced, the armature tips by gravity, opening the circuit through the switch, the bent end portion of stop member 46 limiting the movement of the armature.

In Figs. 4 and 5 of the drawings, the numeral 60 generally indicates a diagrammatic representation of the low water cutout of my invention. Secured to a grounded casing 61 containing water 62 is an electrode 63 surrounded by a hollow electrode 64 having its lower end cut at an angle.

In Fig. 4 is a coil 65 for energizing a core 66 and connected at one end by a wire 67 to the electrode 64. The other end of the coil is connected by a wire 68 through the secondary 69 of a transformer 70 and fuse 71 to ground. A pivoted armature 72 responsive to the flux in core 66 supports a tiltable mercury switch 73.

A shield 74 (equivalent to shield 37 shown in Fig. 2) for wire 67 is connected by a wire 75 through the transformer secondary and the fuse to ground.

The transformer 70 is adapted for use on different line voltages dependent upon the position of jumper 76. The two primary coils 77 and 78 may be connected in series (as shown) for higher line voltage, or only one of them may be used for lower. On the lower line voltage, increased power output may be obtained by the use of an additional jumper (not shown) to connect the primary coils in parallel.

The operation of the device shown in Figs. 1, 2 and 3, and diagrammatically represented in Fig. 4, will now be described. Assuming that the terminals of the mercury tube switch are connected in circuit with a source of current and a normally-closed electrically operated valve controlling fuel supply to a burner for the boiler to which the device is connected, if the level of the water in the boiler is below the electrodes no current can flow between them to the relay, and so the mercury tube switch is held by gravity in open position and thus the fuel supply to the burner is closed by the valve.

If the water in the boiler is now permitted to rise, as by opening a manual valve, on contact of the water with the bottom of the shell electrode a small amount of current will pass through the water between the shell and the casing, but not sufficient to energize the relay to attract its armature. On further rise, the water contacts the portion of electrode 19 above the insulating sleeve 20, a relatively sudden increase in current resulting on account of the shorter path through the water between the electrode 19 and the inner surface of the shell, and the relay armature is attracted, closing the circuit through the mercury tube switch to open the burner control valve.

On still further rise of water, the increased current flowing through the water between the rod and shell electrodes holds the armature firmly attracted. In normal operation of the boiler the water is constantly above the level of the device and so most of the current flows between the electrodes rather than between the shell and the casing. These electrodes being of the same metal, the harmful effect of electrolysis is reduced to a minimum.

If the level of the water in the boiler now falls until it reaches a point just below the bottom of the uninsulated portion of electrode 19, current then only flowing between the shell and the casing, the relay armature remains attracted as less current is required to hold the armature attracted than was required to bring it to that position, a feature which is common to all conventional electromagnetically operated relays.

On further fall of water, normally to a point just above the bottom of the shell, the relay releases its armature to open the fuel control circuit. It is thus seen that a differential of operation of the relay is effected between rise and fall of water level and so any fluctuation of the water near its low level does not produce intermittent operation of the relay.

The sleeve insulator 20, surrounding the lower portion of electrode 19, is not essential to the operation of the device and may under some conditions be discarded. The operation is then similar to that of the cutout diagrammatically shown in Fig. 4. On rise of water in the casing 61, a small amount of current first flows through the water between the angularly cut bottom portion of shell electrode 64 and rod 63. The relay armature is not attracted until the water rises still higher, for example, to the level shown in the drawing. As the water falls the armature remains in attracted position until the water level is just above the bottom of the shell.

Obviously, the "pull-in" and "drop-out" of the relay with respect to the water level can be adjusted by variation of the size, form or relative arrangement of the electrodes, or by the voltage across them.

However, it has been found in practice that a device substantially as shown in the drawings operates satisfactorily with water of average saline content when the voltage across its electrodes is slightly less than twenty. The cutout devices disclosed in the prior art which depend on water conductivity for their operation require relatively very high voltages and so have usually been unsuccessful on account of the effect of electrolysis on their relatively small electrodes. The device of my invention, on account of the effective large electrical area of its electrodes and the resultant low current density at their surfaces, is relatively free from the harmful effect of electrolysis, and the low voltage required minimizes the possibility of electrical insulation break down.

The angular cutting of the bottom portion of the shell electrode as shown in the drawings is also not essential to the operation of the device as described above when the electrodes are mounted in the inclined position shown in Fig. 2, as the effect of rise of water into the inclined mouth of the shell produces a non-linear current increase. Obviously, this effect might also be produced by suitably forming the inner electrode.

The function of the shield 37 (or 74 of Fig. 4) is to prevent the possibility of wire 34 (or 67) shorting to the casing in case of wear or burn of the insulation of cable 33. If this were to occur it will be seen that the electrodes would be short circuited and the device inoperative. However, by interposing the shield in the cable, connected in the circuit as shown, if abrasion of the outer insulation permits contact of the shield with the casing, the fuse will blow as it will then be directly connected across the transformer. Also, if the shell electrode lead becomes shorted to the shield, the relay coil is short circuited and the switch opens.

In Fig. 5 I have shown a modified circuit which may be employed when it is desirable to supply high voltage directly to the relay. A relay core 79 is provided with a primary winding 80 and a secondary winding 81. Line voltage is connected to the primary winding and the cutout 60 to the secondary, which may be wound to provide suitable low voltage. When the circuit through the secondary winding is completed through the water and the electrodes, increased current flows in the primary winding, according to well known electrical laws, and the armature is attracted.

Figure 6:
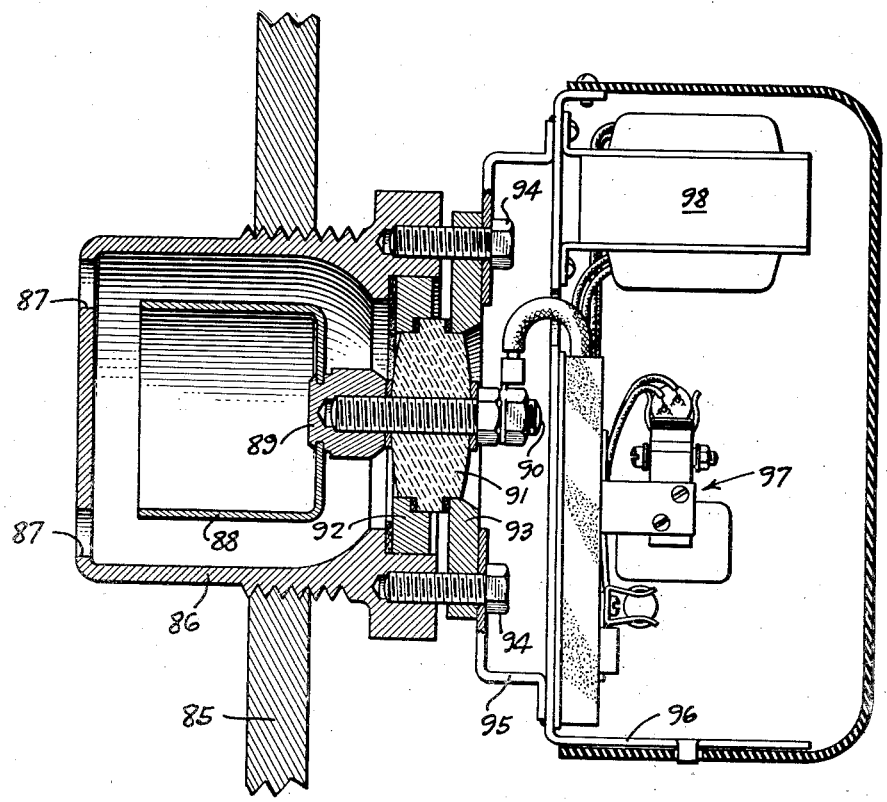
Figure 6 is a sectional view of a modified form of control device embodying my invention.

In the modified cutout shown in Fig. 6, the numeral 85 indicates a portion of the wall of a water boiler which is threaded to receive a shell electrode 86 of general cylindrical form and having a plurality of openings 87 for entrance of water into the shell. A cup-shaped electrode 88, provided with a threaded extension 89, is secured by a terminal rod 90 to an insulating disk 91, of porcelain or the like, which in turn is secured to the shell by plates 92 and 93 and screws 94, resilient sealing washers being provided between the surfaces of the porcelain disk and the plates. Secured by a bracket 95 to the cutout is a case 96 in which is mounted a relay 97, similar to that shown in Figs. 1 and 2, and a transformer 98.

The operation of the cutout device shown in Fig. 6 is substantially identical to that of the device previously herein described. The non-linear effect of the rise of water between the electrodes on the current is produced in this case by the curved surfaces of the electrodes and differential of operation of the relay between rise and fall of the water results. The wall of the portion of the shell within the boiler being continuous, except for the relatively small openings therein, minimizes the possibility of electrolysis resulting from current flow through the water between the boiler wall and the central electrode.

By way of example, I have described the low water cutout device of my invention in connection with the control of an electrically operated fuel supply valve for the boiler burner. However, it is obvious that other electrically operated devices, such as, for example, alarms, may be likewise controlled.

Also, while I have herein shown and described, by way of example, specific embodiments of my invention, it is obvious that modifications may be made therein without departing from the spirit of my invention. I intend, therefore, that my invention be limited only by the scope of the appended claims.

I claim as my invention:

1. In a low water safety device for a boiler, a metallic casing for connection in communication with the water of said boiler adjacent its low level, a first electrode in said casing and in electrical connection therewith, and a second electrode of hollow form spaced from said first electrode and surrounding at least a substantial portion thereof, said second electrode being electrically insulated from said casing and said first electrode.

2. In a low water safety device for a boiler, a metallic casing for connection in communication with the water of said boiler adjacent its low level, a first electrode of rod-like form mounted in a portion of said casing and in electrical connection therewith, and a second electrode of generally tubular form spaced from said first electrode and surrounding a substantial portion thereof, said second electrode being insulatingly mounted in said casing.

3. In a low water safety device for a boiler, a metallic casing for connection in communication with the water of said boiler adjacent its low level, a first metallic electrode in said casing and in electrical connection therewith, and a second metallic electrode of hollow form spaced from said first electrode and surrounding at least a substantial portion thereof, said second electrode being electrically insulated from said casing and said first electrode, said electrodes being so formed and arranged with respect to each other and to said casing that the area of the metallic surfaces presented to the water as it rises in the casing is gradually increased as a non-linear function of the water level.

4. In a low water safety device for a boiler, a metallic casing for connection in communication with the water of said boiler adjacent its low level, a first electrode of rod-like form extending upwardly in said casing, and a second electrode of generally tubular form insulatingly mounted on said casing so that it extends downwardly thereinto to spacingly surround a substantial portion of said first electrode, the lower end of said second electrode being so formed that the area of the surfaces of said electrodes presented to the water between them as it rises in the casing is gradually increased as a non-linear function of the water level.

5. In a low water safety device for a boiler, a metallic casing for connection in communication with the water of said boiler adjacent its low level, a first electrode of rod-like form projecting from an inner wall of said casing and in electrical connection therewith, and a second electrode of generally tubular form insulatingly mounted in said casing so that it spacingly surrounds a substantial portion of said first electrode, the electrodes and the casing being so arranged with respect to each other that there are two major paths for current flow through the water, one path being from the outer wall of the second electrode to the casing and the other path being from the inner wall of the second electrode to the first electrode.

6. In a low water safety device for boilers forming with the water of the boiler a part of an electrical control circuit, a metallic casing having its interior in communication with the interior of the boiler adjacent the low water level therein, a first electrode within the casing and in electrical connection therewith, and a second electrode of hollow form also within said casing and surrounding a substantial portion of said first electrode, said second electrode being insulated and spaced from the walls of said casing and from said first electrode, the paths in the casing from the second electrode respectively to the first electrode and to the walls of the casing being thus in electrical parallel relation.

7. In a low water safety device for a boiler, a first electrode adapted to be mounted in the wall of said boiler adjacent its low level and in electrical connection with the boiler, said first electrode comprising a cup-shaped member of non-ferrous metal the closed end of which extends within the boiler, and a second electrode insulatingly mounted in the cup-shaped member and formed of similar metal, the portion of the cup-shaped member which extends within the boiler having relatively small openings therethrough for communication of boiler water with said electrodes so that current flow through the water from the second electrode to the boiler wall is substantially prevented.

WILLIAM A. RAY.